UNITED STATES PATENT OFFICE.

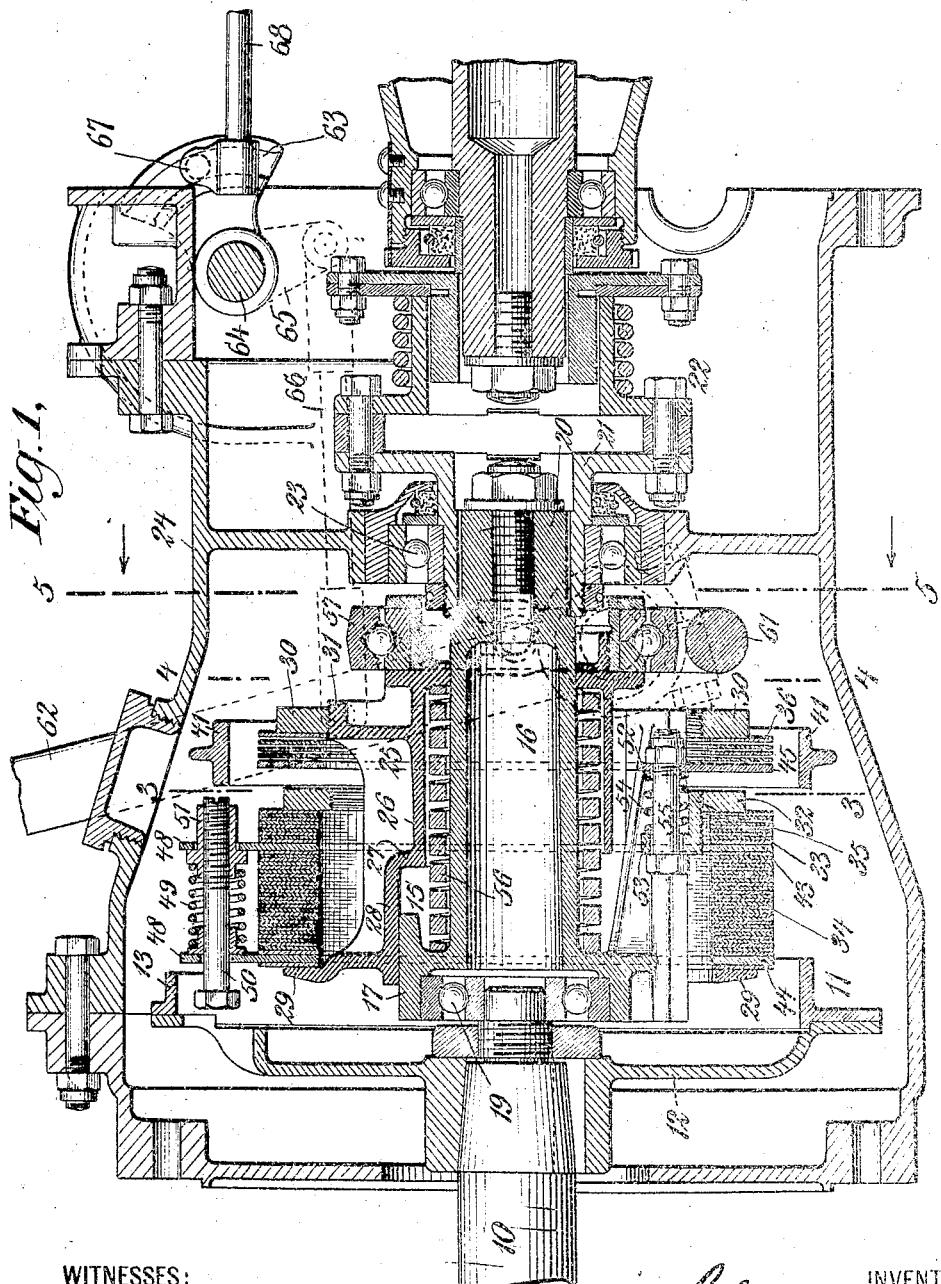

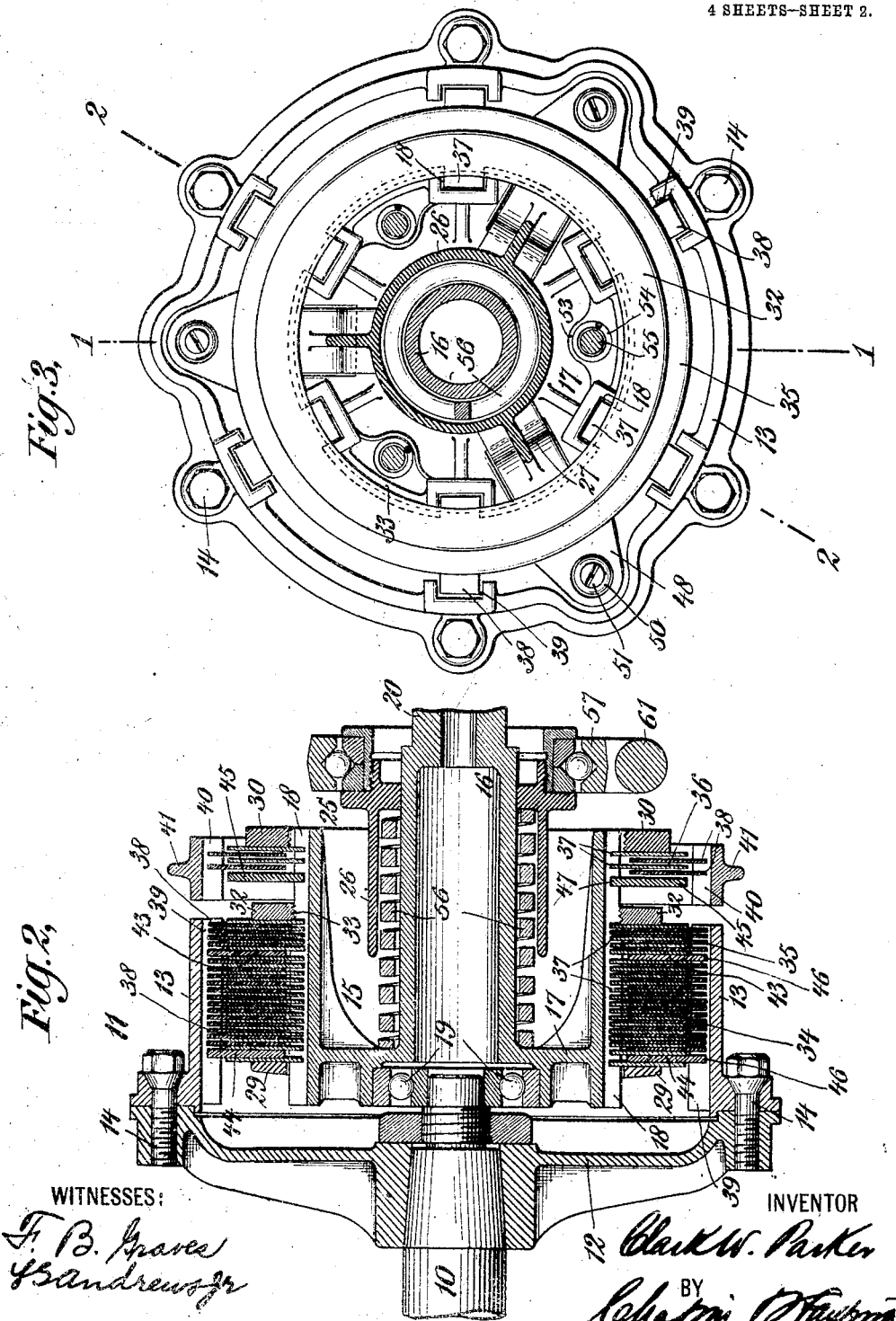

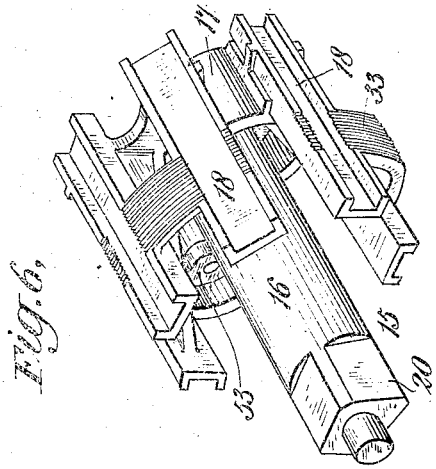
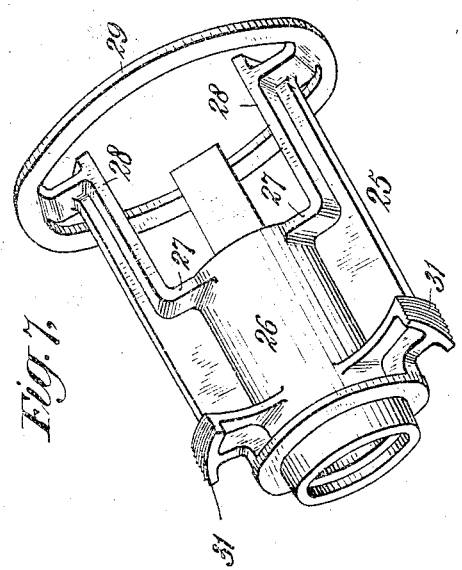
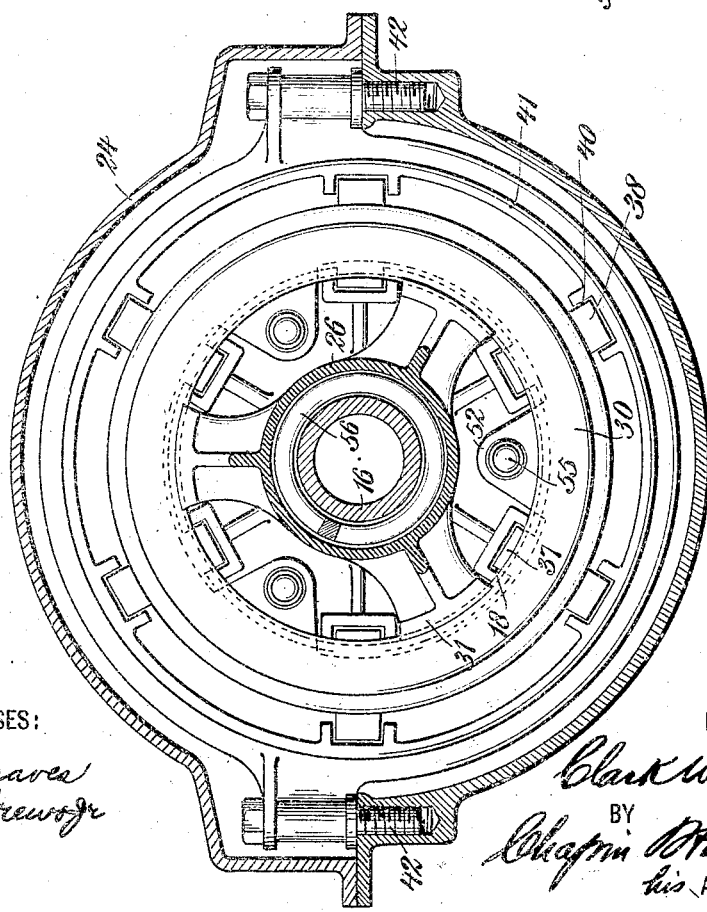

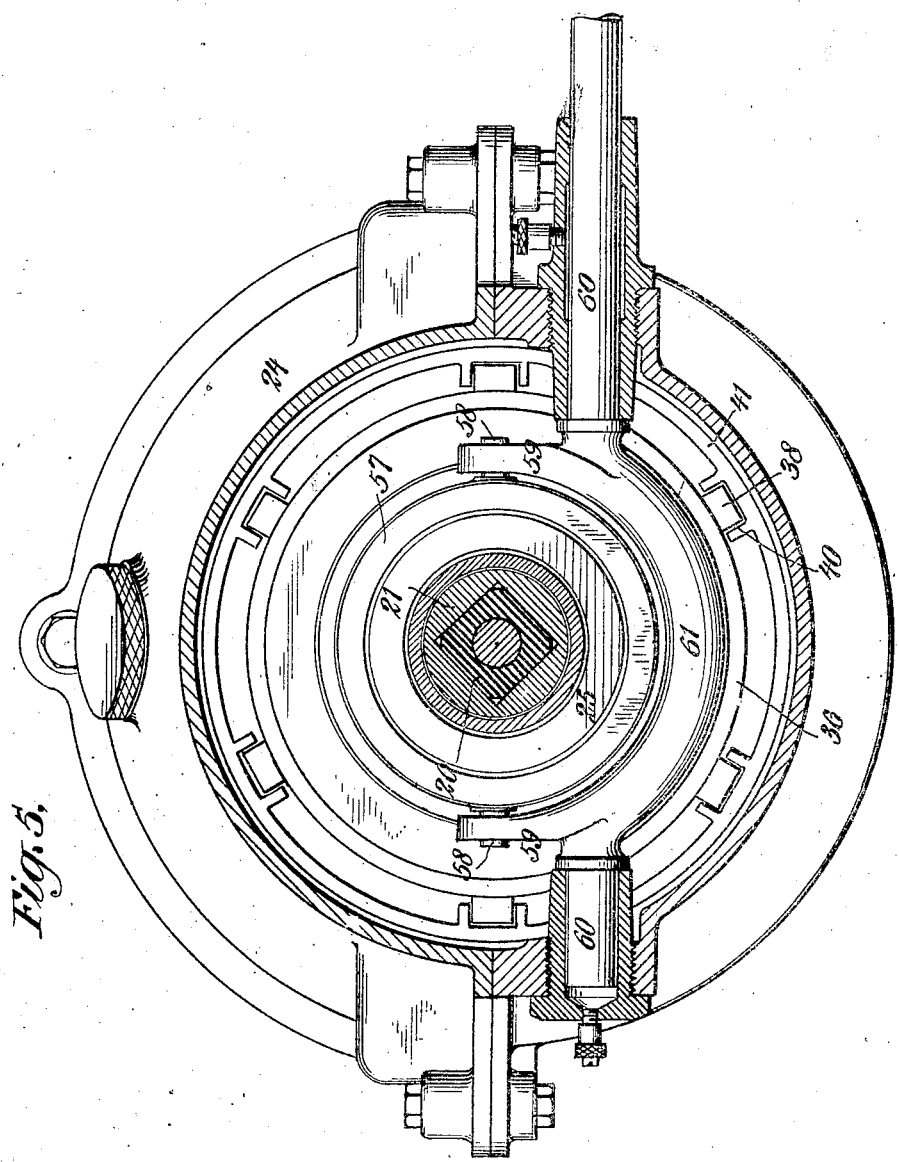

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

CLUTCH AND BRAKE MECHANISM.

1,126,848.  Specification of Letters Patent.  Patented Feb. 2, 1915.

Application filed November 14, 1910. Serial No. 592,135.

*To all whom it may concern:*

Be it known that I, CLARK W. PARKER, a citizen of the United States of America, and a resident of Springfield, county of Hampden, and State of Massachusetts, have invented certain new and useful Improvements in Clutch and Brake Mechanism, of which the following is a specification, reference being had to the accompanying drawings, forming a part thereof.

My invention relates to clutch mechanism, and particularly to friction clutch mechanism such as of the type commonly employed in motor car construction for connecting the motor with the transmission gearing or other parts to be driven; and my invention consists first, in the employment of main and supplementary clutch elements, the former being adapted to be released earlier, and operatively connected later, in the operation of the clutch as a whole, than the latter, the supplementary portion of the clutch comprising a connection capable of transmitting but little power, that is to say, under comparatively slight resistance the connection will yield and slip; second, in a novel form of brake mechanism in combination with friction clutch means by which the momentum of the driven parts may be absorbed after the clutch has been operated to release them from a driving, and particularly in a yielding means employed in the brake mechanism, and the combination therewith of a relatively adjusted yielding means employed in the clutch mechanism; and third, in the combination of the clutch and brake mechanism and the operating means therefor, with a locking means, whereby the said locking means is not released until a certain point has been reached in the operation of the clutch and brake mechanism.

The main object of my invention is to avoid shock both in the operation of the clutch and in the operation of parts driven through the clutch.

In carrying out my invention I employ many novel details of construction and combinations of parts such as will be fully pointed out hereinafter, and in order that my invention may be thoroughly understood, I will now proceed to describe an embodiment thereof, having reference to the accompanying drawings illustrating the same, and will then point out the novel features in claims.

In the drawings: Figure 1 is a view in central vertical longitudinal section through a clutch and brake mechanism constructed in accordance with my invention, the plane of section being indicated by the line 1—1 in Fig. 3. Fig. 2 is a detail view in central longitudinal section through the clutch and brake members and their correlated parts, the plane of section being indicated by the line 2—2 in Fig. 3. Fig. 3 is a transverse sectional view upon the line 3—3 of Fig. 1, the outer casing having been removed. Fig. 4 is a transverse sectional view upon the line 4—4 of Fig. 1. Fig. 5 is a transverse sectional view upon the line 5—5 of Fig. 1. Fig. 6 is a detail view in perspective of one of the parts to be driven, such part being hereinafter termed the "driven hub." Fig. 7 is a detail view in perspective of a sliding hub employed.

The driving element comprises a shaft 10, a portion of which appears in Figs. 1 and 2, such shaft conveniently comprising the shaft of a driving motor. Secured to the rear end of this shaft is a driving hub 11. This driving hub includes a head 12 and a substantially cylindrical ring 13, the latter in the construction herein shown being securely fastened to the former by means of bolts 14. Mounted concentrically with the said driving shaft 10 and driving hub 11 is a driven hub 15, for a detail view of which see Fig. 6. This hub comprises a central shaft portion 16, the greater part of which is preferably hollow, a head 17, and a plurality of longitudinal channel bars 18 supported by the head 17 and projecting rearwardly thereof parallel with the said shaft portion 16. The forward end of the shaft portion 16 is conveniently supported by an anti-friction bearing 19 carried by the rear extremity of the shaft 10, while the rear end of the shaft portion 16 is conveniently squared as at 20 and received within a corresponding socket formed in a sleeve or collar 21 which forms one member of a coupling means 22 such as constitutes a means by which the driven hub 15 is permanently connected to rotate with the parts to be driven. The collar or sleeve 21 is mounted to rotate in a suitable anti-friction bearing 23 carried by a casing 24 in which the clutch and brake mechanism is contained, as will be readily seen by reference to Fig. 1 of the drawings. The two bearings 19 and 23 constitute the means by which the driven hub 16, as a whole, is mounted to rotate axially in line with the axis of the shaft 10. Mounted concentrically about the shaft portion 16 of the driven hub 15 is a support 25 which I term herein the "intermediate" or "sliding" hub. (For a detail perspective view of this part see Fig. 7). This element 25 partakes of the movement of rotation of the driven hub 15 but is permitted a relative longitudinal movement with respect thereto. It comprises a sleeve 26 which surrounds the hollow shaft portion 16 of the driven hub 15, a plurality of radially projecting arms 27 which have longitudinally extending portions 28 constituting channel irons which lie between the channel bars 18 of the driven hub 15, the interior face of the said channel irons resting upon portions of the head 17 of the said driven hub 15, a ring 29 formed as an integral part of the sliding hub 25 and which constitutes a forward abutment for certain of the friction disks, as will presently be explained, and another ring 30 secured thereto by a screw-threaded engagement (see particularly Fig. 4) and which forms another abutment for others of the friction disks as will also appear hereinafter. It may be noted that the ring 30 has been removed from the sliding hub in the perspective view Fig. 7, but it is supported by the screw-threaded projections 31 clearly illustrated in that figure, and is shown in place in Fig. 4.

A ring 32 similar to the ring 30 is mounted in screw-threaded engagement upon a screw-threaded portion 33 of the driven hub 15, the said ring being removed in the perspective view Fig. 6, but clearly shown as mounted upon the driven hub in Fig. 2. This ring likewise constitutes an abutment for certain of the friction disks as will likewise presently appear. There are three groups of friction disks employed, the groups being respectively designated by the reference characters 34—35 and 36. Each of these groups comprise two sets of disks whose individual members are arranged in alternation, the disks of one of the sets of each of the three groups having inwardly projecting tongues 37 which are received in sliding relation within the channel bars 18 of the driven hub, the other set of each of the groups 34 and 35 having outwardly projecting tongues 38 which are received within channels 39 formed upon the inner surface of the cylindrical ring 13 of the driving hub 11, and the other set of the group 36 having similar outwardly projecting tongues 38 which are received within channels 40 arranged upon the inner surface of a stationary ring 41 which is secured fast to the casing 24 by means of stub bolts or cap screws 42 (see Fig. 4). For purposes of the present specification, the disks of groups 34 and 35 may be termed clutch disks and the disks of the group 36 brake disks. Of the clutch disks those of the group 34 may be termed the main clutch disks and those of the group 35 the supplementary clutch disks. The clutch disk groups 34 and 35 are disposed between the stationary abutments 29 and 32 while the disks of the group 36 are disposed between the stationary abutments 32 and 30. The main and supplementary clutch disk groups 34 and 35 are separated by means of a separating plate 43, and there is a similar separating plate 44 arranged in front of the group 34, and another separating plate 45 arranged in front of the group 36. The separating plates 43 and 44 are carried by the driving hub, being provided with outwardly projecting tongues 46, corresponding to the tongues 38 of the disks of the groups 34 and 35, and received as in the case of the said disk tongues, within the channels 39 of the ring 13. The separating ring 45 on the other hand is provided with inwardly projecting tongues 47 corresponding to the inwardly projecting tongues 37 of the disks 36, and like them received within the channel bars 18 of the driven hub 15.

By reason of the foregoing the separating plates 43 and 44 rotate with the driving hub while the separating plate 45 rotates with the driven hub 15. These separating plates also constitute in effect friction disks, their surfaces being used for friction purposes in a similar manner to that in which the surfaces of the other friction disks are employed. The two separating plates 43 and 44 are each provided with radial wings 48 (see Figs. 3 and 4) between which are arranged helical springs 49 which are normally under tension so that they exert a force to press the said separating plates apart. Threaded bolts 50 pass through openings in the said wings 48 and through the helical springs 49, the said bolts being provided with nuts 51 by means of which their position longitudinally may be adjusted. With the parts in the position shown in the drawings the heads of the bolts 50 are disposed at some little distance in front of the separating plate 44 so that the separating plate 44 is capable of a movement to a limited distance away from the separating plate 43, after which the two plates will move together. The separating plate 45 is provided with inwardly projecting wings 52 which are arranged in line with corresponding wings 53 carried by the driven hub, and springs 54 are disposed between the two sets of wings 52—53 so that the separating plate 45 will be normally forced away from the ring or abutment 32 carried by the driven hub 15. The extent of this movement is limited by bolts and nuts 55 which pass through the wings 52—53 and through the helical springs 54, the adjustment therefore being such that, in the normal condition of the parts (and in which condition they are shown in the drawings), the separating plate 45 will be held away from the group of disks 36 and there will be no endwise pressure upon the disks such as would cause operative frictional engagement between them.

The parts are maintained in their normal operative positions by a heavy helical spring 56 which surrounds the hollow shaft 16 of the driven hub 15 and is partially inclosed within the sleeve 26 of the intermediate or sliding hub 25. This spring is under normal compression and exerts a force tending to move the driven and intermediate hubs longitudinally in opposite directions, i. e. wherein the abutment 29 carried by the hub 25 will move toward the abutment 32 carried by the hub 15.

Mounted upon the rear end of the intermediate or sliding hub 25 is a collar 57, the connection between the said collar and sliding hub being preferably an anti-friction ball bearing one as is shown. This connection is such as to permit a free movement of rotation of the sliding hub with respect to the collar while compelling the two said parts to partake the one of the longitudinal movements of the other. The collar 57 is provided with trunnions 58 which are received by operating arms 59 pivotally mounted by means of a rock shaft 60 in the casing 24, the two ends of the rock shaft 60 being connected by a yoke 61 which passes beneath the collar as is clearly shown in Fig. 5. Any suitable operating element such, for instance, as a pedal lever 62, may be secured to the rock shaft 60, and by the manipulation of which the rock shaft may be operated. Located in proximity to some part movable upon the operation of the clutch is a locking device here shown as in the form of a locking quadrant 63. The said quadrant is mounted upon a rock shaft 64, which is provided in the present instance with an operating arm 65, connected by a link 66 with the pedal lever 62, whereby when the pedal lever is operated a rocking movement will be imparted to the quadrant. The quadrant engages a locking pin 67 carried by an element 68 which is to be locked against movement in the normal running condition of the parts. This element 68 may constitute for instance a shipping rod for controlling the operation of transmission gearing mechanism.

The operation of the device is as follows: Considering the parts in their normal positions and in which they are shown in the drawings, the spring 56 exerts a pressure between the driven hub 15 and the intermediate or sliding hub 25 such as tends to force the abutments 29—32 together. This causes the sets of disks of the two groups 34—35 to be forced into intimate frictional engagement, it being noted that the force of the spring 56 is a great deal more than is necessary to overcome the slight resistance of the helical springs 49 tending to force the separating plates 43—44 apart. It being remembered that one set of the disks of each of the groups 34—35 is connected to rotate with the driving hub while the other set is connected to rotate with the driven hub, it will then follow that under such conditions the driving and driven hubs will be connected to rotate together. The two sets of disks of the group 36 being at such time out of frictional engagement as has been stated above, the relative rotation of one of the sets with respect to the other will at such times be a movement idle to any immediately useful result. Now if pressure be applied to the lever 62 in a direction toward the left (as viewed in Fig. 1), the result will be that the sliding hub will be moved to the left with respect to the driving and driven hubs. During the first part of this movement the lost motion will be taken up between the front face of the separating disk 44 and the rear faces of the heads of the bolts 50, the separating disk 44 following the movement of the abutment 29 under the influence of the springs 49. This will result in the two sets of the group of disks 34 being relieved from operative frictional engagement, the extent of this movement being somewhat in excess of that sufficient to relatively free them. While the disks of the group 34 are being relieved, the springs 49 will act to maintain the disks of the supplementary group 35 in frictional engagement, but with a gradually decreasing force because the said springs are expanding and their energy is being thereby absorbed. During the movement of the abutment 29 away from the abutment 32, the abutment 30 will be moving toward it. In the first part of such movement of the abutment 30, the clearance between the individual disks of the brake group 36 and between the said group 36 and the separating plate 45 will be taken up, and in the continued movement of the parts, a pressure, yielding because of the helical springs 54, will be imparted to the brake disks, whereby in their intimate frictional engagement a braking action will be imparted to the driven parts, such of course resulting from the fact that one set of the disks 36 is secured to rotate with the driven hub, while the other set is held stationary by means of the ring 41. This braking action is designed to commence before the main clutch disks are entirely relieved, and will preferably increase to a point wherein just as the main clutch disks have been entirely relieved, and just prior to the release of the supplementary group of clutch disks, it will substantially balance the remaining frictional hold in the clutch disks. Upon a further movement of the pedal lever in the same direction, the supplementary clutch disks will be completely relieved, because the separating plate 44 will, in its continued movement, carry the separating plate 48 therewith, the springs 49 thereupon merely expending their energy between the heads and nuts of the bolts 49. In the said continued movement of the pedal lever the tension upon the brake springs 54 will have been increased, so that under ordinary conditions the momentum of the driven parts will by this time have been entirely absorbed and the said parts will be at rest, but under conditions of extremely high speed of running, or if for any reason it be desired that the driven parts be brought quickly to rest, then a slight further movement of the pedal lever will bring the brake disks hard up against the longitudinally stationary abutment 32, and a braking action to any extent, dependent only upon the force applied to the lever 62, may be effected. In other words, under such conditions the brake will be applied positively, instead of through the yielding springs 54.

From the foregoing it will be seen that, in the movement of the pedal lever to release the clutch, every condition from full driving relation to a condition of positive stopping will exist successively, and as a result thereof the common tendency of this character of clutch to let go suddenly is obviated; moreover, it will be seen that there is a point in the operation of the device in which the main clutch elements will be relieved and a yielding driving connection will be afforded through the supplemental clutch elements, and this connection may be used for a purpose and in the manner I will now explain.

The connection between the pedal lever and the locking quadrant 63 is such that in the aforesaid movement of the operating lever the quadrant will be brought to a position wherein it will release the locking pin 67 just at the moment the balance above referred to between the brake and the clutch elements is established, i. e., at just the moment the plate 44 reaches the rear faces of the heads of the bolts 50. At this time therefore, but not until this time, the element 68 may be moved. Thus assuming the element 68 to be a part of the means by which changes in driving relations may be effected in transmission gearing, it will only be possible to operate the mechanism to bring about these changes after the driving connection has been brought to a point of substantial release. However, after the aforesaid transmission mechanism has been operated it is often necessary that the driven parts be turned over to a slight degree, in order for instance for the transmission gearing clutches to complete their engagement, the desirable form of clutches employed for this mechanism being jaw clutches which require certain relative positions of the parts before they will coengage. It is at this time, and for this purpose, that the yielding driving connection through the supplementary clutch elements 36 may be employed. A slight release of the brake pedal, permits the powerful spring 56 to move the parts to an extent sufficient to substantially relieve the pressure upon the brake disks while increasing the pressure upon the supplementary clutch disks 35, through an increased pressure upon the springs 49, bringing about the condition necessary for the purpose. The connection resulting from the foregoing will afford sufficient power for the purpose, while yielding so as to prevent shock particularly at the moment the transmission gearing clutches complete their engagement. Thereafter, upon a release of the pedal the parts will be returned to the normal position in which they are shown in the drawings, by the action of the powerful spring 56 as will be well understood.

While I have spoken herein of the groups of clutch and brake elements as each comprising two "sets", and have shown the sets as each consisting of a plurality of disks, it will of course be understood that the clutch and brake elements may be varied both as to form and number as may be desired, for instance each or any so called "set" may if preferred include but a single part or member.

It may be noted that while this application contains claims to the main and supplemental clutch mechanism when employed in combination with the brake means, there are no claims herein to the main and supplemental clutch mechanism *per se*, that is to say, except in such combination. The claims on the main and supplemental clutch mechanism *per se* have been canceled from this case in compliance with a requirement of the Patent Office for division as between them and the claims remaining herein.

What I claim is:

1. Mechanism of the class described comprising a driving element, a driven element, a friction clutch mechanism for connecting them, friction brake mechanism for the driven element and operating means movable into one position to operate the clutch mechanism, and into another position to operate the brake mechanism, the clutch and brake mechanism being arranged so that the operations thereof overlap when the operating means is intermediate said positions, substantially as and for the purpose described.

2. Mechanism of the class described comprising a driving element, a driven element, and a stationary element, co-acting friction clutch elements connected to rotate respectively with the driving and driven elements, co-acting friction brake elements, the one of which is connected to rotate with the driven element and the other of which is secured to the stationary element and thereby held against rotation, and operating means movable to and between two positions, in one of which the clutch mechanism only is operated, in the other of which the brake mechanism only is operated, and in a position thereof intermediate the two said positions both the said clutch and brake mechanisms are partially operated, so that in one position there will be a point of substantial balance between them.

3. Mechanism of the class described comprising a driving element, and driven elements including a rotary hub which is held against longitudinal movement, and a sliding hub mounted to rotate with the first said hub but permitted longitudinal movements with respect thereto, co-acting friction clutch elements connected to rotate respectively with the driving and driven elements, co-acting friction brake elements the one of which is connected to rotate with the driven element and the other of which is held against rotation, one of the said driven element hubs being provided with two end abutments for respective engagement with a clutch element at one end and with a brake element at the other end, and the other of the said driven element hubs being provided with an intermediate abutment located between the said clutch and brake elements, in position to coact with both the brake and clutch elements during the longitudinal movements of said sliding hub, and means for imparting longitudinal movements to the said sliding hub.

4. Mechanism of the class described comprising a driving element, and driven elements including a rotary hub which is held against longitudinal movement, and a sliding hub mounted to rotate with the first said hub but permitted longitudinal movements with respect thereto, a group of clutch disks comprising two sets one of which is connected to rotate with the driving element and the other of which is connected to rotate with the driven element, a group of brake disks comprising two sets one of which is connected to rotate with the driven element, and the other of which is held against rotation, one of the said driven element hubs being provided with two end abutments for respective engagement with the clutch disks at one end and with the brake disks at the other end, and the other of the said driven element hubs being provided with an intermediate abutment located between the two said groups of disks, a spring for normally forcing the sliding hub longitudinally in a direction wherein the said clutch disks will be pressed together by the intermediate abutment and one of the said end abutments, and means under the control of an operator for moving the said hub longitudinally in the opposite direction wherein the said clutch disks will be freed, and the said brake disks will be pressed together by the intermediate abutment and the other of the said end abutments.

5. Mechanism of the class described comprising a driving element, a driven element mounted concentrically therewith, a group of clutch disks mounted concentrically with the said driving and driven elements and comprising two sets, one of which is connected to rotate with the driving element and the other of which is connected to rotate with the driven element, a group of brake disks concentrically mounted to the rear of the said clutch disks and also comprising two sets, one of which is connected to rotate with the driven element, and the other of which is held against rotation, the said driven element being provided with an abutment arranged between the said clutch and brake disks into position to coact with both the clutch and brake disks, and a longitudinally movable sliding hub having end abutments, the one arranged in front of the said clutch disks and the other arranged to the rear of the said brake disks, and operating means for moving the said sliding hub longitudinally with respect to the abutment carried by the said driven elements.

6. Mechanism of the class described comprising a driving element, a driven element, a friction clutch mechanism for connecting them, friction brake mechanism for the driven element, operating means movable into one position to operate the clutch mechanism and into another position to operate the brake mechanism, the clutch and brake mechanisms being arranged so that the operations thereof overlap when the operating means is intermediate said positions, yielding pressure means for controlling the application of the brake mechanism, and yielding pressure means for controlling the application of the clutch mechanism during the overlapping of the operations of the clutch and brake mechanisms, substantially as and for the purpose set forth.

7. Mechanism of the class described comprising a driving element, a driven element, friction clutch mechanism for connecting them, friction brake mechanism for the driven element and yielding pressure means for the brake mechanism, yielding pressure means for the clutch mechanism, and a member connected to the clutch and the brake mechanisms to successively release the clutch mechanism and apply the brake mechanism, and the yielding pressure means of the brake and clutch mechanisms being arranged to overlap in their operations and being arranged so that one yielding pressure means increases as the other decreases during the operation of said member, substantially as and for the purpose described.

8. Mechanism of the class described comprising a driving element, a driven element, friction clutch mechanism for connecting them, friction brake mechanism for the driven element and yielding pressure means for the brake mechanism, yielding pressure means for the clutch mechanism, a member connected to the clutch and the brake mechanisms to successively release the clutch mechanism and apply the brake mechanism, and the yielding pressure means of the brake and clutch mechanisms being arranged to overlap in their operations and being arranged so that one yielding pressure means increases as the other decreases during the operation of said member, and a main spring tending to hold the friction clutch mechanism in engagement and the friction brake mechanism out of engagement, substantially as and for the purpose specified.

9. Mechanism of the class described, comprising a driving element, a driven element, friction clutch mechanism for connecting them, friction brake mechanism for the driven element, yielding pressure means for the brake mechanism, operating means for the clutch and brake mechanism including means for operating the brake mechanism, through the said yielding pressure means while simultaneously releasing pressure upon the clutch mechanism, and an abutment for the brake mechanism, whereby upon a further movement of the said operating means, positive non-yielding pressure may be applied to the said brake mechanism.

10. In mechanism of the class described, a driving element, a driven element, and a stationary element, the driven element including two members rotatable together and one slidable lengthwise of the other, the slidable member being formed with opposing abutments and the other member being formed with an abutment between the former abutments, clutch disks associated respectively with the driving element and the non-slidable member of the driven element and located between one of the end abutments of the sliding member and the intermediate abutment on the non-sliding member, brake disks associated respectively with the stationary element and the non-sliding member, and located between the other end abutment of the sliding driven member and the intermediate abutment, and means for sliding the sliding member in opposite directions, substantially as and for the purpose described.

11. In mechanism of the class described, a driving element, a driven element, and a stationary element, the driven element including two members rotatable together and slidable lengthwise of the other, the slidable member being formed with opposing abutments and the other member being formed with an abutment between the former abutments, clutch disks associated respectively with the driving element and the non-slidable member of the driven element and located between one of the end abutments of the sliding member and the intermediate abutment on the non-sliding member, brake disks associated respectively with the stationary element and the non-sliding member and located between the other end abutment of the sliding driven element and the intermediate abutment, a main spring arranged to normally press the sliding member in one direction to hold the clutch disks against the intermediate abutment, and additional spring means acting on the brake disks and tending to normally hold the brake disks in frictional contact against the separating action of the main spring on the brake disks, and means for operating the sliding member against the action of the main spring, substantially as and for the purpose specified.

12. In mechanism of the class described, a driving element, a driven element, and a stationary element, the driven element including two members rotatable together and one slidable lengthwise of the other, the slidable member being formed with opposing abutments and the other member being formed with an abutment between the former abutments, clutch disks associated respectively with the driving element and the non-slidable member of the driven element and located between one of the end abutments of the sliding member and the intermediate abutment on the non-sliding member, brake disks associated respectively with the stationary element and the non-sliding member, and between the other end abutment of the sliding driven member and the intermediate abutment, a main spring acting on the sliding driven member to hold the clutch disks in engagement, and additional relatively weak spring means tending to separate one group of the clutch disks and to hold another group of the clutch disks against the intermediate abutment, and means for operating the sliding member against the action of the main spring, substantially as and for the purpose set forth.

13. In mechanism of the class described, a driving element, a driven element, and a stationary element, the driven element including two members rotatable together and one slidable lengthwise of the other, the slidable member being formed with opposing abutments and the other member being formed with an abutment between the former abutments, clutch disks associated respectively with the driving element and the non-slidable member of the driven element and located between one of the end abutments of the sliding member and the intermediate abutment on the non-sliding member, brake disks associated respectively with the stationary element and the non-sliding member, and located between the other end abutment of the sliding driven member and the intermediate abutment, a main spring acting on the sliding driven member to hold the clutch disks in engagement, additional relatively weak spring means tending to support one group of the clutch disks and to hold another group of the clutch disks against the intermediate abutment, spring means tending to normally hold the brake disks in engagement against the separating action of the main spring, and means for operating the sliding member against the action of the main spring, substantially as and for the purpose described.

CLARK W. PARKER.

Witnesses:
F. B. GRAVES,
LYMAN S. ANDREWS, Jr.